United States Patent [19]

Kirschner et al.

[11] Patent Number: 4,627,016

[45] Date of Patent: Dec. 2, 1986

[54] MEMORY ADDRESS LOCATION SYSTEM FOR AN ELECTRONIC POSTAGE METER HAVING MULTIPLE NON-VOLATILE MEMORIES

[75] Inventors: Wallace Kirschner, Trumbull, Conn.; Easwaran C. N. Nambudiri, East Meadow, N.Y.; Douglas H. Patterson, Norwalk, Conn.

[73] Assignee: Pitney Bowes Inc., Stamford, Conn.

[21] Appl. No.: 643,112

[22] Filed: Aug. 22, 1984

[51] Int. Cl.[4] .............................................. G06F 12/00

[52] U.S. Cl. .................................................... 364/900

[58] Field of Search ... 364/900 MS File, 200 MS File

[56] References Cited

U.S. PATENT DOCUMENTS 4,564,922 1/1986 Muller ................................. 364/900

*Primary Examiner*—James D. Thomas
*Assistant Examiner*—Emily Yue Chan
*Attorney, Agent, or Firm*—Michael J. DeSha; Albert W. Scribner; William D. Soltow, Jr.

[57] ABSTRACT

A method and associated apparatus is provided for using data stored in one non-volatile memory to locate the next memory address in which to write data in another non-volatile memory of an electronic postage meter, comprising the steps of and associated apparatus for providing a first non-volatile memory for storing data therein including cumulative piece count data corresponding to the number of completed postage transactions, providing a second non-volatile memory for storing accounting data sequentially therein for each one of a predetermined number of trip cycles of the postage meter which number corresponds to the number of individually addressable trip cycle memory locations in the second non-volatile memory and defines a modulus of the second non-volatile memory, retrieving the cumulative piece count data from the first non-volatile memory during a power up cycle, dividing the cumulative piece count data by the modulus of the second non-volatile memory, and using the remainder resulting from the division to locate the next individually addressable trip cycle memory location in the sequence of memory locations in the second non-volatile memory for writing the accounting data for the first trip cycle of the meter after completion of the power up cycle.

8 Claims, 4 Drawing Figures

MEMORY ADDRESS LOCATION SYSTEM FOR AN ELECTRONIC POSTAGE METER HAVING MULTIPLE NON-VOLATILE MEMORIES

BACKGROUND OF THE INVENTION

The present invention relates to electronic postage meters, and more specifically to a method and associated apparatus for using data stored in one non-volatile memory (NVM) to locate the next sequential memory address in which to write data in another NVM of an electronic postage meter.

Various electronic postage meter systems have been developed, as for example, the systems disclosed in U.S. Pat. No. 3,978,457 for Microcomputerized Electronic Postage Meter Systems, U.S. Pat. No. 3,938,095 for Computer Responsive Postage Meter, European Patent Application No. 80400603.9, filed May 5, 1980, for Electronic Postage Meter Having Improved Security and Fault Tolerance Features, U.S. Pat. No. 4,301,507, for Electronic Postage Meter Having Plural Computing Systems, and co-pending application Ser. No. 447,815, filed Dec. 8, 1982, now U.S. Pat. No. 4,579,054, for Stand-Alone Electronic Mailing Machine.

Generally electronic postage meters include some form of non-volatile memory capability to store critical postage accounting information. This information includes, for example, the amount of postage remaining in the meter for subsequent printing and the total amount of postage already printed by the meter. Other types of accounting or operating data may also be stored in the non-volatile memory, as desired.

However, conditions can occur in electronic postage meters where information stored in non-volatile memory may be lost. A total line power failure or fluctuation in voltage conditions can cause the microprocessor associated with the meter to operate erratically and either cause erasure of data or the writing of spurious data in the non-volatile memory. The erasure of data or the writing of spurious data in the non-volatile memory may result in a loss of critical accounting information. Since the accounting data changes with the printing of postage and is not permanently stored elsewhere, there is no way to recapture or reconstruct the lost accounting information. Under such circumstances, it is possible that a user may suffer a loss of postage funds.

To minimize the likelihood of a loss of information stored in the non-volatile memory, various approaches have been adopted to insure the high reliability of electronic postage meters. It is known from aforementioned U.S. Pat. No. 3,978,457 and aforementioned copending application Ser. No. 447,815, now U.S. Pat. No. 4,579,054, to provide a microprocessor controlled electronic postage meter having memory architecture which includes a temporary storage memory for storing accounting data reflecting each meter transaction and a non-volatile memory to which the accounting data is transferred during the power down cycle of the meter.

Another approach for preserving the stored accounting data has been the use of redundant non-volatile memories. One such redundant memory system is disclosed in patent application Ser. No. 343,877, now abandoned, filed Jan. 29, 1982, in the name of Frank T. Check, Jr., and entitled Electronic Postage Meter Having Redundant Memory. With such redundant memory system the two redundant non-volatile memories are interconnected with a microprocessor by way of completely separated data and address lines to eliminate error conditions. The data stored in each memory is the same, although the data may be in a different form in each memory, e.g., it may be coded. The data is applied to the memories simultaneously or sequentially at different times during the postage transactions.

Another redundant memory system is disclosed in the aforementioned European Patent Application No. 80400603.9. In such patent application, the same accounting data is written into each of the two non-volatile memories designated BAMs, by updating the specific registers of the BAMs twice during each postage meter transaction, once in temporary form and once in permanent form to minimize the loss of accounting data during microprocessor failure.

Co-pending patent application Ser. No. 643,113, filed on Aug. 22, 1984, and entitled, Electronic Postage Meter Having Multiple Non-Volatile Memories For Storing Different Historical Information Reflecting Postage Transactions, discloses a first non-volatile memory having cumulative historical information of postage transactions written therein during the power down cycle of the meter and a second non-volatile memory having a greater data storage capacity than the first non-volatile memory for sequentially writing historical information regarding each trip cycle of the meter in a different address in the second non-volatile memory in real time as each postage transaction occurs so that two different records of historical information regarding the postage transactions are provided.

SUMMARY OF THE INVENTION

It is an object of the present invention to provide a memory address location system for an electronic postage meter having multiple non-volatile memories.

It is a further object of the present invention to provide a system for using data stored in one NVM to locate the next sequential memory address in which to write data in another NVM.

It is a still further object of the present invention to provide a memory address allocation system in which the data in one NVM is used as a relative pointer to the appropriate memory address to continue writing in another NVM.

Briefly, in accordance with the present invention, a method and associated apparatus is provided for using data stored in one non-volatile memory to locate the next memory address in which to write data in another non-volatile memory of an electronic postage meter, comprising the steps of and associated apparatus for providing a first non-volatile memory for storing data therein including cumulative piece count data corresponding to the number of completed postage transactions, providing a second non-volatile memory for storing accounting data sequentially therein for each one of a predetermined number of trip cycles of the postage meter which number corresponds to the number of individually addressable trip cycle memory locations in the second non-volatile memory and defines a modulus of the second non-volatile memory, retrieving the cumulative piece count data from the first non-volatile memory during a power up cycle, dividing the cumulative piece count data by the modulus of the second non-volatile memory, and using the remainder resulting from the division to locate the next individually addressable trip cycle memory location in the sequence of memory locations in the second non-volatile memory for writing the accounting data for the first trip cycle of the meter after completion of the power up cycle.

Other objects, aspects and advantages of the present invention will be apparent from the detailed description considered in conjunction with the drawings, as follows:

DETAILED DESCRIPTION

Figure 1:
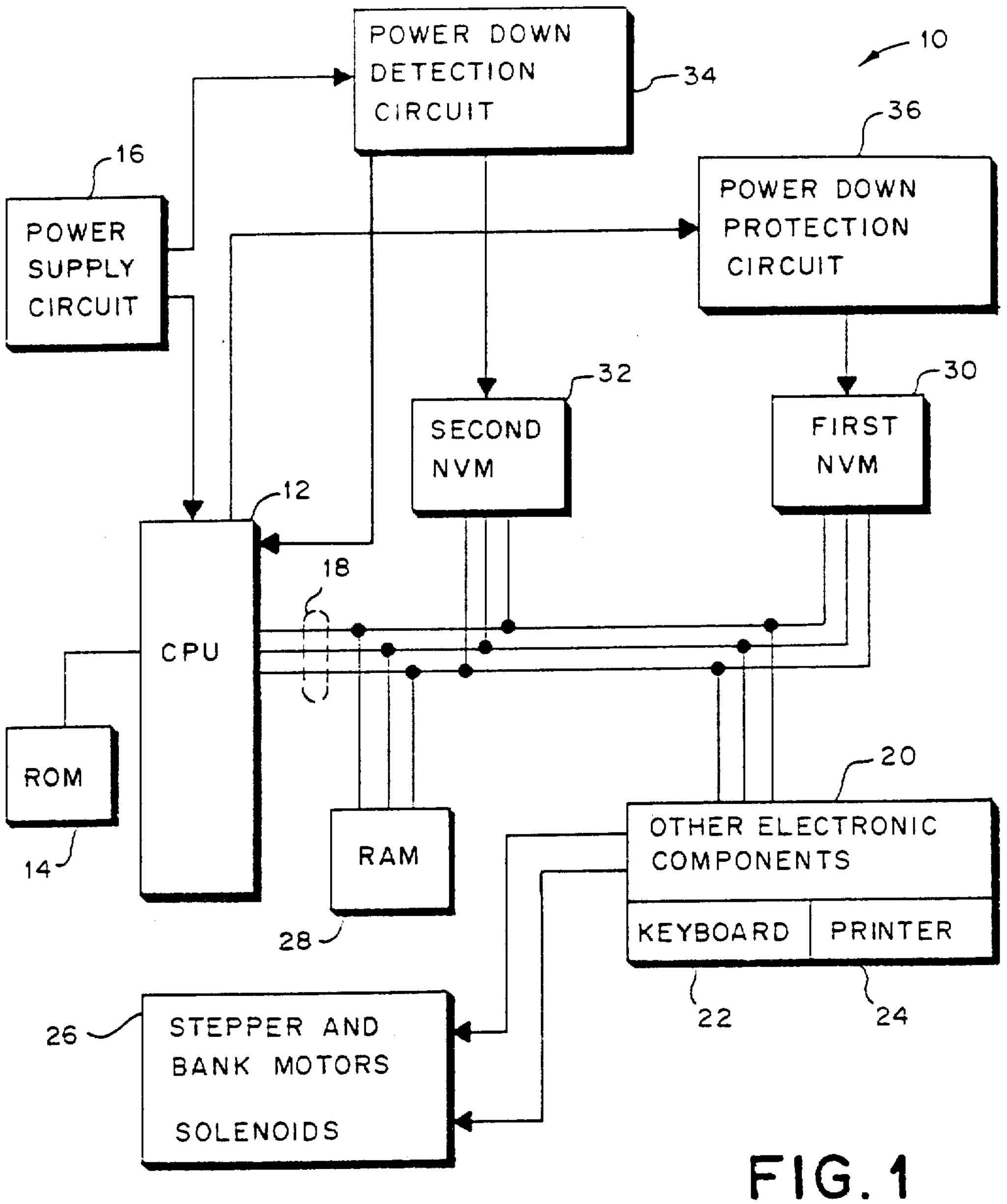
FIG. 1 is a block diagram illustrating a memory address location system for an electronic postage meter in accordance with the present invention.

Referring to FIG. 1, a memory address location system for an electronic postage meter having multiple NVMs in accordance with the present invention is generally illustrated at 10. Preferably, the general architecture of the electronic postage meter is similar to that disclosed in the aforementioned co-pending patent application Ser. No. 447,815, now U.S. Pat. No. 4,579,054, modified as disclosed in FIG. 1 to incorporate a real time NVM, as described in more detail in copending application Ser. No. 643,219, filed on Aug. 22, 1984 and entitled, Non-Volatile Memory System With Real Time and Power Down Data Storage Capability For An Electronic Postage Meter. Specifically, a central processing unit 12, in the form of a microprocessor, e.g., a Model 8085A microprocessor, is operated under program control in accordance with the programs stored in a ROM 14. The microprocessor 12 is energized by the output of a power supply circuit 16 during a power up cycle to place the meter in an operative condition. During operation of the postage meter the microprocessor 12 transmits and receives signals over a data bus 18 coupled to the various meter components.

Generally, the microprocessor 12 transmits signals to and receives signals from the other electronic components 20, the keyboard 22 and the printer 24 for the actuation of digit stepper and bank stepper motors and solenoids 26 to accomplish the printing of postage on a document. Each such postage imprinting operation or printing transaction is referred to as a trip cycle.

During each trip cycle, a certain amount of postage is used. A volatile random access memory 28, such as model 8155 with the appropriate input and output and timing circuits, contains an ascending register (AR), a descending register (DR) and appropriate cycle redundancy codes (CRCs) and control sums. During each trip cycle, and under control of the microprocessor 12, the descending register is decremented the appropriate amount for the postage used during the trip and the ascending register is incremented the appropriate amount for the postage used during the trip. Thus, the AR provides a running or current total of the amount of postage that has been used through completion of the last trip cycle and the DR provides a running or current total of the amount of postage remaining in the meter for subsequent use.

A first NVM 30, such as an ER 3400 MNOS integrated circuit chip, is also electrically coupled to the data bus 18. Under control of the microprocessor 12, accounting data which is temporarily stored in the RAM 28 during each meter transaction is transferred from the RAM 28 and written into the first NVM 30 upon commencement of a power down cycle. For example, 15 different data addresses or blocks are provided in the first NVM 30 for sequentially writing cumulative accounting during each power down cycle to maximize the endurance of the memory.

During normal operation of the postage meter, the first NVM 30 is held in a non-write condition by the output signals from the microprocessor 12 over data bus 18. However, during a power failure (power down cycle), the microprocessor 12 initiates a power down cycle routine in which the accounting data which has been temporarily stored in the volatile RAM 28 is transferred or written into one of the data blocks of the first NVM 30. Advantageously, the first NVM 30 also stores cumulative piece count data reflecting the number of completed trips or individual postage transactions.

Also coupled to the data bus 18 to receive accounting data from the microprocessor 12 is a second NVM 32. Preferably, the NVM 32 is a SEEQ 5516A electrically erasable read only memory (EEROM) having an endurance of 1 million write cycles. However, it should be understood that other NVMs which have high endurances may also be utilized, such as a battery backed CMOS integrated circuit chip or other similar integrated circuit chips. Under control of the microprocessor 12 the accounting data for each postage transaction, e.g., postage used, and any other accounting data, as desired, such as AR and DR, is written into individually addressable trip cycle memory locations of the NVM 32. Accounting data, such as AR and DR, as well as cumulative piece count and batch count data, is also temporarily stored in RAM 28.

Under control of the microprocessor 12 and during a power up cycle of the meter, the cumulative piece count data which was written into the first NVM 30 during a power down cycle is retrieved from the first NVM and applied to a divider 34, which may be, for example, a two's complement adder circuit. Advantageously, the divider 34 has a modulus which corresponds to the number of individually addressable trip cycle memory locations of the second NVM 32. The output from the divider 34 which represents the remainder resulting from dividing the cumulative piece count data with the modulus serves as a pointer for the microprocessor 12 and enables it to locate the next sequential memory address in the second NVM 32 in which to write accounting data for the next trip.

Figure 2:
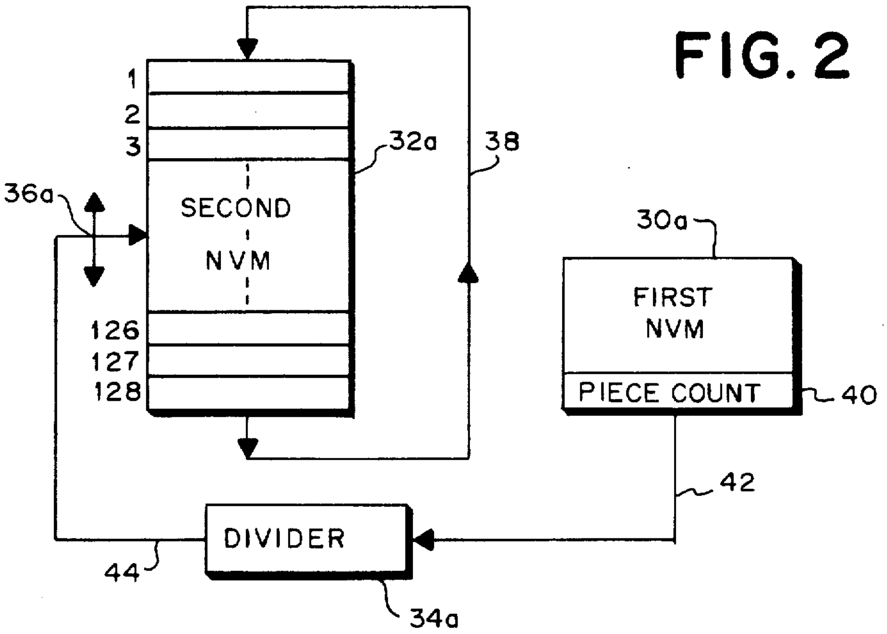
FIG. 2 is a block diagram showing the interaction between the multiple NVMs in FIG. 1 in more detail.

Referring to FIG. 2, the second NVM 32 of FIG. 1 is shown in enlarged form in FIG. 2 as 32A. The NVM 32A is illustrated with a plurality of individually addressable trip cycle memory locations, designated as 1 through 128, for sequentially storing accounting data of each postage transaction or trip cycle. Further, the accounting data for the first trip cycle of the meter is stored in memory location 1 and designated Trip 1 and the accounting data for the second trip cycle is stored in memory location 2 and designated Trip 2. This storage of accounting data continues sequentially through the memory locations, the last of which is designated here as Trip 128. Various accounting data including the postage used during that trip or the cyclic redundancy code for each trip, as well as AR and DR may be stored at each address 1-128, as desired.

The second NVM 32A as illustrated in FIG. 2 includes 128 individually addressable trip cycle memory locations, thereby allowing it to store a maximum of 128 postage transactions or trip cycles prior to a power down cycle. Advantageously, the last memory location address, here 128, is electrically connected to the first memory location or address 1 through line 38 so that if the number of individually addressable trip cycle memory locations of the NVM 32A are less than the number of trip cycles or postage transactions which the meter has actually undergone, a continuous data loop is provided so that subsequent trips, i.e., 129, 130, etc. are sequentially written into memory addresses 1, 2, etc., enabling the memory addresses 1–128 to be sequentially re-used to provide a continuous "permanent" record or historical file of the last 128 trip cycles or postage transactions of the meter. It should be understood that a NVM having a smaller or greater number of individually addressable trip cycle memory locations than 128 may be employed, as desired.

Under control of the microprocessor 12, data representing the cumulative piece count is read from piece count memory address 40 of the first NVM 30A and applied to a divider 34A over line 42 which divides the cumulative piece count data by the modulus of the second NVM 32A. The output (remainder) from the divider 34A is used as a relative pointer by the microprocessor 12 to access the second NVM 32A over line 44 in accordance with the programs stored in ROM 14. The numeral 36A is used as a reference to indicate movement to select the proper memory location, although it should be understood that this is accomplished by the microprocessor 12. For example, if the number stored in the piece count memory address 40 is 16, this number since it is less than or equal to the modulus is used directly by the microprocessor 12 as a relative pointer for the next memory address, i.e., 17, in the second NVM 32A. For a piece count of 160, the piece count is greater than the modulus so that the remainder, (160 divided by 128) here 32, is used by the microprocessor as a relative pointer for the next memory address, i.e., 33, in the second NVM 32A.

Figure 3:
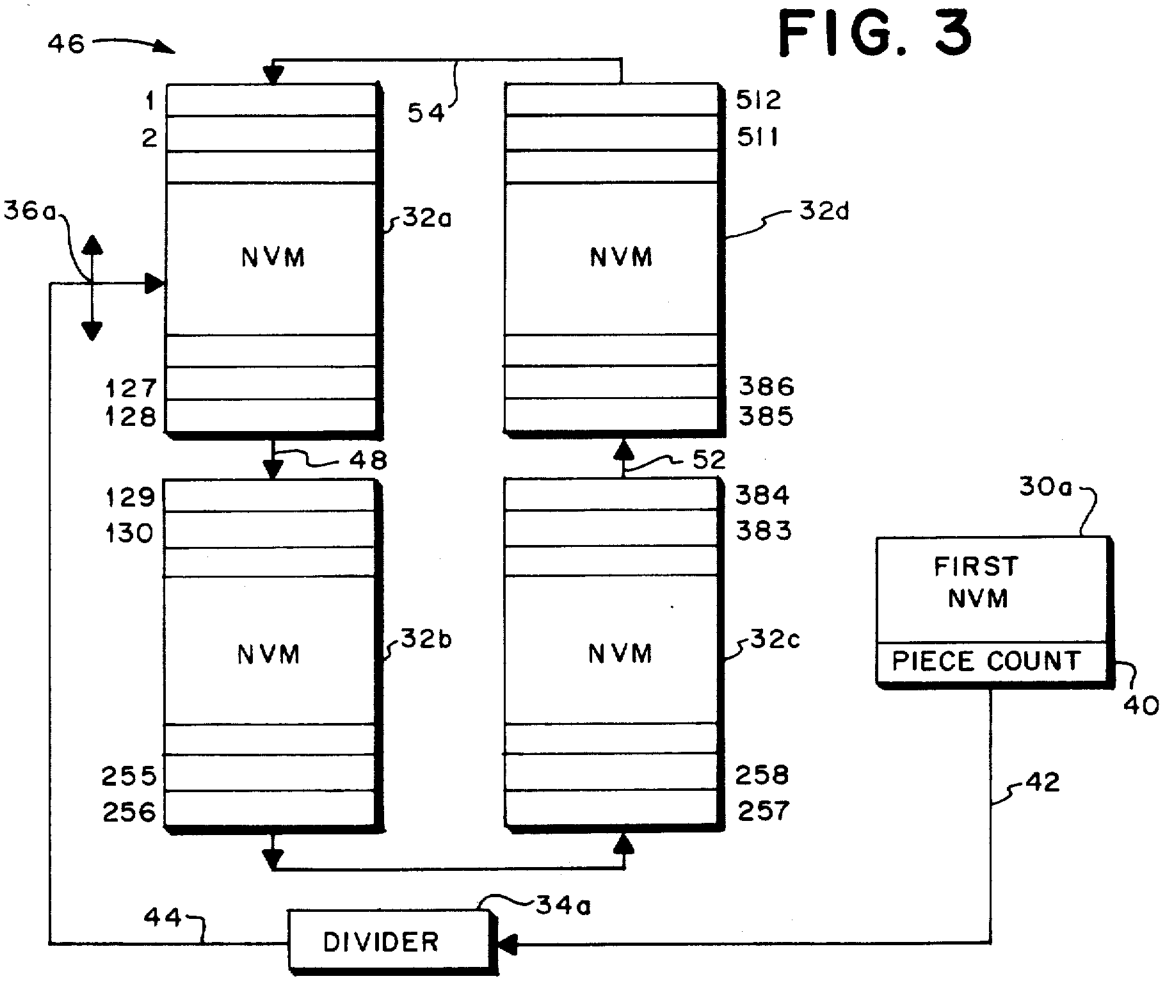
FIG. 3 is a block diagram showing multiple NVM chips connected in cascade to expand the memory capacity of the real time NVM.

Referring to FIG. 3, an expanded real time NVM 46 is illustrated including a plurality of NVMs chips, here four, designated 32A–32D. The NVMs 32A–32D are connected in cascade to provide an expanded predetermined number of separately addressable trip cycle memory locations, designated 1–512, to store 512 individual transactions or trip cycles. To implement this cascade arrangement of NVMs 32A–32D, the last memory address 128 of NVM 32A is electrically connected to the first memory address 129 of the NVM 32B through line 48, the last memory 256 of NVM 32B is electrically connected to the first memory address 257 of the NVM 32C through line 50, the last memory address 384 of NVM 32C is electrically connected to the first memory address 385 of the NVM 32D through line 52, and the last memory address 512 of the NVM 32D is electrically connected to the first memory address 1 of the NVM 32A through line 54. Thus, a continuous data loop is provided between the NVM chips 32A–32D to provide a "permanent" record or historical file of the last 512 trips or postage transactions. Advantageously, in the event of meter failure, this historical information file provides a complete audit trail of a predetermined number of postage transactions in accordance with the memory capacity of the NVM 32 or expanded NVM 36.

Similarly to FIG. 2, the output from the piece count register 40 in FIG. 3 is applied to the divider 34A over line 42 to determine the remainder. Of course, the modulus of the divider 34A in FIG. 3 is 512. The output from the divider 34A is used by the microprocessor 12 to locate or identify the next sequential individually addressable trip cycle memory location in the expanded NVM 46 in which to write accounting data for the next trip.

Figure 4:
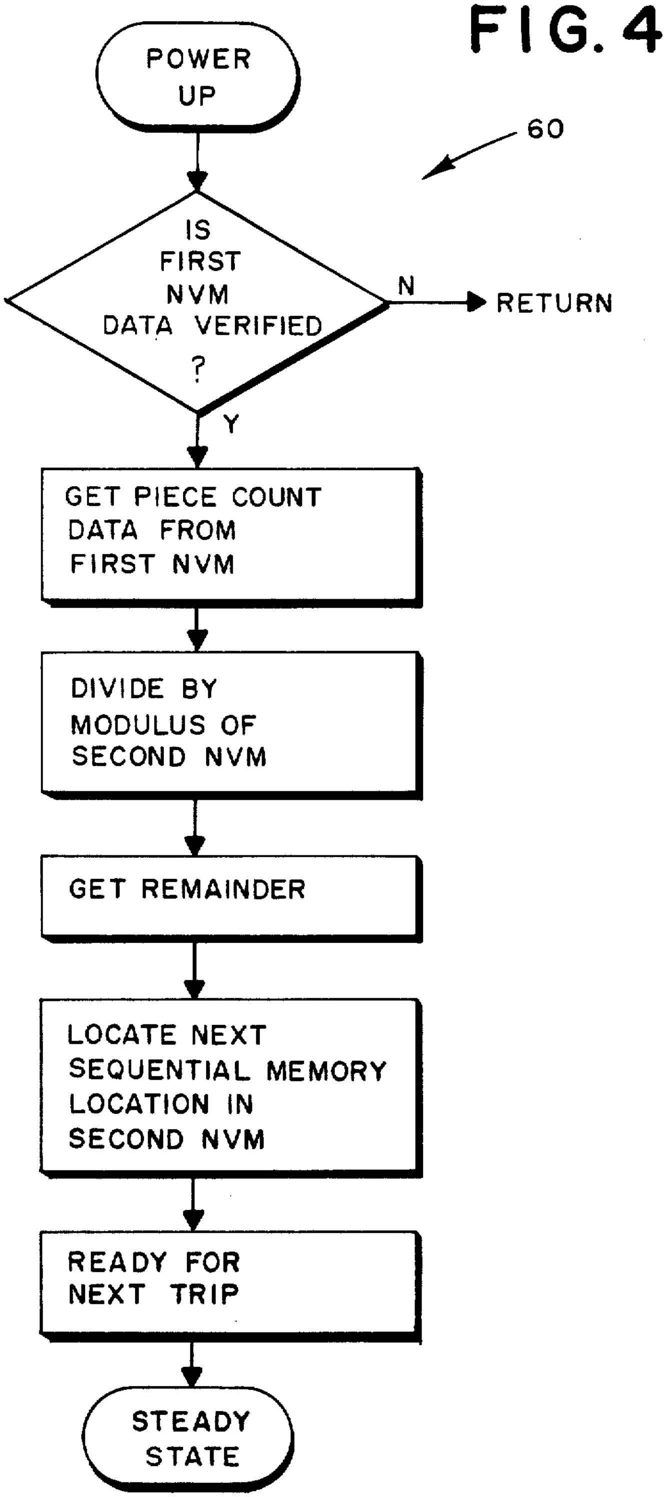
FIG. 4 is a flowchart of the operation of the memory address location system of the present invention during the power up cycle of the meter.

Referring to FIG. 4, a flowchart of the operation of the memory address location system during a power up cycle of the meter is generally illustrated at 60. During the power up cycle, the cumulative piece count data in the first NVM 30 is first verified as accurate by the microprocessor 12. Thereafter, the cumulative piece count data is obtained from the first NVM 30 under control of the microprocessor 12 and applied to the divider 34 where it is divided by the modulus of the second NVM 32, see also FIGS. 1 through 3. The remainder is used by the microprocessor 12 to locate or identify the next sequential memory location in the second NVM 32 to write accounting data for the next trip cycle. That is, the microprocessor 12 has located the next sequential memory and the meter is returned to its steady state awaiting a trip.

Referring also to FIG. 2, during power up, after verification of the piece count data, the piece count data from memory location 40 of the first NVM 30A is applied to a divider 34A where it is divided by the modulus, here 128, corresponding to the number of separately addressable trip cycle memory locations in the second NVM 32A for storing accounting data for each trip of the meter. The output remainder from the divider 32A is used by the microprocessor 12 for selecting the next sequential memory location in the second NVM 32A in which to write data. The interconnection of the last memory location 128 to the first memory location 1 provides a continuous data loop for storing the last 128 trips of the meter.

The operation of the expanded NVM 46 of FIG. 3 is similar to that of FIG. 2. Here, four NVM chips 32A through 32D are connected in cascade to expand the memory capacity of the second NVM. In this case, 512 memory locations for storing trip accounting data are provided. Therefore, the modulus employed in the divider 34A is 512. The next sequential memory location in the expanded NVM 46 is located or identified in accordance with the remainder provided by the divider 34A. Writing of trip accounting data will continue indefinitely around the continuous data loop provided by the interconnected NVM 32A through 32D, limited only the endurance of the NVMs, with the limit on the maximum number of trip cycles capable of being stored at any one time corresponding to the number of individually addressable trip cycle memory locations, here 512.

From the foregoing description, it should be apparent that a memory address location system is provided in which data in one NVM is utilized to locate the next sequential memory location for accounting data to be written in another NVM during the power up cycle of the meter. In effect an audit trail is provided with the data in one NVM being advantageously used to locate the proper memory location in another NVM in which to begin writing accounting data during the next trip of the meter.

It should be understood for the purpose of the present application that the term postage meter refers to the general class of devices for the imprinting of a defined unit value for governmental or private carrier delivery of parcels, envelopes or other like applications for unit value printing. Thus, although the term postage meter is utilized, it is both known and employed in the trade as a general term for devices utilized in conjunction with services other than those exclusively employed by governmental postage and tax services. For example, private, parcel and freight services purchase and employ such meters as a means to provide unit value printing and accounting for individual parcels.

Further, it will be apparent to those skilled in the art that various modifications may be made in the present invention without departing from the spirit and scope thereof as described in the specification and defined in the appended claim.

What is claimed is:

1. A method of using data stored in one non-volatile memory to locate the next memory address in which to write data in another non-volatile memory of an electronic postage meter, comprising the steps of:

providing a first non-volatile memory for storing data therein, the data including cumulative piece count data corresponding to the number of completed postage transactions;

providing a second non-volatile memory for storing accounting data sequentially therein for each one of a predetermined number of trip cycles of the postage meter which number corresponds to the number of individually addressable trip cycle memory locations in the second non-volatile memory and defines a modulus of the second non-volatile memory;

retrieving the cumulative piece count data from the first non-volatile memory during a power up cycle;

dividing the cumulative piece count data by the modulus of the second non-volatile memory; and using the remainder resulting from the division step to locate the next individually addressable trip cycle memory location in the sequence of memory locations in the second non-volatile memory for writing the accounting data for the first trip cycle of the meter after completion of the power up cycle.

2. The method recited in claim 1, including the steps of:

verifying the accuracy of the cumulative piece count data stored in the first non-volatile memory;

writing accounting data into the next sequential individually addressable trip cycle memory location in the second non-volatile memory resulting from the first trip cycle of the meter after completion of a power up cycle.

3. The method recited in claim 1, wherein:

the cumulative piece count data is directly used to locate the next individually addressable trip cycle memory location in the second non-volatile memory if the cumulative piece count is less than or equal to the modulus and the remainder resulting from division of the cumulative piece count data by the modulus is used to locate the next individually addressable trip cycle memory location if the cumulative piece count data is greater than the modulus.

4. A system for using data stored in one non-volatile memory to locate the next memory address in which to write data in another non-volatile memory of an electronic postage meter, comprising:

first non-volatile memory for storing data reflecting postage transactions, including cumulative piece count data corresponding to the number of completed postage transactions;

second non-volatile memory having a plurality of individually addressable trip cycle memory locations for storing accounting data therein for each one of a predetermined number of trip cycles of the meter which number corresponds to the number of said individually addressable trip cycle memory locations in said second non-volatile memory and defines a modulus of said second non-volatile memory;

microprocessor means for retrieving the cumulative piece count data from said first non-volatile memory during a power up cycle;

dividing means for dividing the cumulative piece data by the modulus of said second non-volatile memory;

said microprocessor means using the remainder resulting from said dividing means to locate the next individually addressable trip cycle memory location in the sequence of memory locations in said second non-volatile memory for writing the accounting data for the first trip cycle of the meter after completion of the power up cycle.

5. The system recited in claim 4, wherein:

said microprocessor means verifies the accuracy of the cumulative piece count data stored in said first non-volatile memory and selects the next sequential memory location in said second non-volatile memory to write accounting data therein in accordance with the remainder obtained from said dividing means for the first trip cycle of the meter after completion of the power up cycle.

6. The system recited in claim 4, wherein:

said microprocessor means uses the cumulative piece count data directly to locate the next individually addressable trip cycle memory location in said second non-volatile memory if the cumulative piece count data is less than or equal to the modulus and the remainder resulting from the division of the cumulative piece count data by the modulus in said dividing means if the cumulative piece count data is greater than the modulus.

7. The system recited in claim 4, wherein:

said microprocessor means writes accounting data resulting from the first trip cycle of the meter after completion of a power up cycle into the next sequential individually addressable trip cycle memory location of said second non-volatile memory.

8. The system recited in claim 4, wherein:

said microprocessor means verifies the accuracy of the cumulative piece count data stored in said first non-volatile memory and selects the next sequential memory location in said second non-volatile memory to write accounting data therein in accordance with the remainder obtained from said dividing means for the first trip cycle of the meter after completion of the power up cycle;

said microprocessor means uses the cumulative piece count data directly to locate the next individually addressable trip cycle memory location in said second non-volatile memory if the cumulative piece count is less than or equal to the modulus and the remainder resulting from the division of the cumulative piece count data by the modulus in said dividing means if the cumulative piece count data is greater than the modulus;

said microprocessor means writes accounting data resulting from the first trip cycle of the meter after completion of a power up cycle into the next sequential individually addressable trip cycle memory location of said second non-volatile memory.

* * * * *